US012673462B2

(12) United States Patent
Bierbaumer et al.

(10) Patent No.: US 12,673,462 B2
(45) Date of Patent: Jul. 7, 2026

(54) METHOD AND APPARATUS FOR THE ADDITIVE MANUFACTURE OF A PRODUCT

(71) Applicant: KRAUSSMAFFEI TECHNOLOGIES GMBH, Munich (DE)

(72) Inventors: Andreas Bierbaumer, Prutting (DE); Daniel Hummel, Eningen unter Achalm (DE); Alexander Nguyen, Reutlingen (DE); Max Hossinger, Metzingen (DE); Jan Ininger, Reutlingen (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 412 days.

(21) Appl. No.: 18/044,587

(22) PCT Filed: Sep. 22, 2021

(86) PCT No.: PCT/EP2021/076077
§ 371 (c)(1),
(2) Date: Mar. 9, 2023

(87) PCT Pub. No.: WO2022/063837
PCT Pub. Date: Mar. 31, 2022

(65) Prior Publication Data
US 2023/0330929 A1 Oct. 19, 2023

(30) Foreign Application Priority Data

Sep. 23, 2020 (DE) ..................... 10 2020 124 782.6

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/393* (2017.08);
(Continued)

(58) Field of Classification Search
None
See application file for complete search history.

(56) References Cited

U.S. PATENT DOCUMENTS

| | | | |
|---|---|---|---|
| 2017/0050388 A1* | 2/2017 | Minardi | ................ B29C 64/106 |
| 2017/0122322 A1 | 5/2017 | Zinniel et al. | |

(Continued)

FOREIGN PATENT DOCUMENTS

| | | | |
|---|---|---|---|
| DE | 10 2016 223 244 A1 | 5/2018 | |
| EP | 3 112 133 A1 | 1/2017 | |

(Continued)

OTHER PUBLICATIONS

Machine English translation of WO2018184797A1, Accessed Feb. 25, 2025 (Year: 2018).*
Machine English translation of WO2017206127, Accessed Apr. 1, 2025 (Year: 2017).*

(Continued)

*Primary Examiner* — Abbas Rashid
*Assistant Examiner* — Adrianna N Konves
(74) *Attorney, Agent, or Firm* — Chrisman Gallo Tochtrop LLC

(57) ABSTRACT

The application relates to a method for the additive manufacture of a product, wherein a melt is discharged via a 3D printing head and the melt is deposited in the form of a melt strand on a printing table to form the product, wherein the 3D printing head and/or the printing table are moved in space in accordance with a product-specific computer program. The application is characterised in that the melt is supplied to the 3D printing nozzle via a needle valve nozzle. For the additive manufacture of the product, a volumetric flow of melt is specified which is specified by the geometry of the melt strand to be deposited and the traverse rate of the 3D printing nozzle and/or the printing table. The nozzle needle is moved between the closed position and the open
(Continued)

position in such a way that the specified volumetric flow is maintained during the additive manufacture of the product.

6 Claims, 2 Drawing Sheets

(51) Int. Cl.

| | |
|---|---|
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2018/0056602 A1 | 3/2018 | Susnjara et al. |
| 2019/0036337 A1* | 1/2019 | Zhang .................. B29C 64/227 |

FOREIGN PATENT DOCUMENTS

| | | |
|---|---|---|
| EP | 3 156 216 A1 | 4/2017 |
| WO | 2017/206127 A1 | 12/2017 |
| WO | 2018/044386 A1 | 3/2018 |
| WO | 2018/184797 A1 | 10/2018 |

OTHER PUBLICATIONS

International Search Report issued in corresponding application, PCT/EP2021/076077; Mailing date: Dec. 14, 2021.
Written Opinion issued in corresponding application, PCT/EP2021/076077; Mailing date: Dec. 14, 2021.

* cited by examiner

METHOD AND APPARATUS FOR THE ADDITIVE MANUFACTURE OF A PRODUCT

CROSS-REFERENCE TO RELATED APPLICATIONS

This application is a U.S. National Stage entry of PCT/EP2021/076077, filed Sep. 22, 2021, which claims benefit of priority to German application 10 2020 124 782.6, filed Sep. 23, 2020, the entire disclosures of which are hereby incorporated herein by reference.

FIELD OF THE INVENTION

The invention relates to a method for the additive manufacture of a product, wherein a melt is discharged via a 3D print nozzle and the melt is deposited in the form of a melt filament in order to build the product on a print table, wherein the 3D print nozzle and/or the print table are moved in space in accordance with a computer program which is specific for the product. The invention also relates to an apparatus for carrying out this method.

BACKGROUND OF THE INVENTION

Methods and apparatus for the additive manufacture of a product are known in many forms in the prior art. Normally, a method of this type is also referred to as 3D printing and an apparatus which is suitable for this is also known as a 3D printer.

3D printers for the additive manufacture of relatively large products are known in the prior art in a variety of different forms (WO2018/044386 A1, EP 3 112 133 A1). Depending on the format, the 3D print heads used therein may have a considerable weight. 3D printers are known in which the 3D print heads can have a weight of up to 100 kg. The large weight of such a 3D print head leads to large inertias during an accelerating motion, which can give rise to vibrations. This results in chatter marks in the printed surface, and consequently leads to a to poor print quality. In order to avoid these disadvantages, it is known to reduce the print speed and/or to use a 3D printer with a rigid frame construction. These measures result on the one hand in a slow build of the product, and on the other hand in a very rigidly constructed and therefore expensive 3D printer.

From the document DE 10 2016 223244 A1, a method for the additive manufacture of a product is known wherein plastic melt is discharged from a needle shut-off nozzle onto a print table. The nozzle needle, also known as a needle valve, is driven by means of an actuator, whereupon the needle shut-off nozzle can be opened and closed. In the open position, plastic melt is discharged onto the print table. In that method, the geometry of the melt filament is specified by the geometry of the outlet opening of the needle shut-off nozzle and is therefore limited to a melt filament with a circular cross section.

A similar method is known from the document US 2017/0122322 A1. In contrast to the aforementioned prior art, the conical tip of the nozzle needle is configured with a circumferential screw-shaped depression in the manner of a screw extruder and can also be driven in rotation. By means of the spacing between the tip and the nozzle opening, the volumetric flow of 3D printing material which is being discharged can be adjusted or regulated.

BRIEF SUMMARY OF THE INVENTION

Starting from the aforementioned prior art, the aim of the invention is to provide a method and an apparatus with which a product can be manufactured relatively quickly by means of 3D printing, wherein a 3D print head with a comparatively low weight can be used.

These aims are achieved by means of a method with the features of claim 1. Advantageous embodiments and further developments are defined in the dependent claims.

In accordance with a central concept of the present invention, during 3D printing, the discharge of the melt from the print nozzle which has a specific geometry or a specific nozzle cross section is continuously regulated by means of a nozzle needle of a needle shut-off nozzle. The needle shut-off nozzle has a housing and a nozzle needle which can be displaced therein. The melt is directed to the 3D print nozzle via this needle shut-off nozzle. In this regard, as the printing procedure is being carried out, the nozzle needle is moved between a closed position in which the nozzle needle bears against an outlet opening which is in fluid communication with the 3D print nozzle and which closes it, and an open position in which the nozzle needle is at a distance from the outlet opening of the housing which can be specified. In this regard, for the additive manufacture of the product, a volumetric flow of melt being discharged from the 3D print nozzle is specified; this is specified by the shape of the outlet opening of the 3D print nozzle and therefore of the geometry of the melt filament to be deposited on the one hand and the speed of movement of the 3D print nozzle and/or of the print table on the other hand. The print nozzle is moved between the closed position and the open position while carrying out the printing procedure in a manner such that during the additive manufacture of the product, the specified volumetric flow of melt being discharged from the 3D print nozzle is maintained.

In accordance with a preferred embodiment, in order to regulate the volumetric flow, the pressure of the melt before the melt enters the needle shut-off nozzle and the pressure of the melt after exit from the needle shut-off nozzle are measured and sent to a controller.

Preferably, a needle shut-off nozzle may be used in which the nozzle needle has a needle tip which tapers conically at least in sections and in which for this purpose, the front end of the housing is appropriately conical in configuration in a manner such that the needle tip and the front end of the housing are in close contact against one another in the closed position of the needle shut-off nozzle and the throughput of melt is interrupted. By moving the nozzle needle, the channel cross section between the conically configured surfaces of the nozzle needle and housing can be varied in accordance with the specified volumetric flow.

Furthermore, provision may be made such that prior to carrying out dry runs in which the 3D print nozzle and/or the print table are moved without depositing a melt filament, the nozzle needle is initially retracted and subsequently moved into the closed position. This prevents the melt from dripping out of the 3D print nozzle. In particular, an abrupt retraction of the nozzle needle means that a negative pressure is produced in the system which effectively prevents melt from dripping out of the 3D print nozzle. In addition, the generation of strings of melt during dry 3D print runs can be reduced.

Furthermore, a control curve which is a function of the geometry of the 3D print nozzle may be stored in the controller or in a computer system and this control curve is used during the additive manufacture of the product, wherein the channel cross section in the needle shut-off nozzle is varied in accordance with the control curve.

In accordance with one embodiment, provision may be made such that the melt is produced by means of an extruder which is in fluid communication with the needle shut-off nozzle, wherein the fluid connection employed is preferably a pipe or a tube. In addition, a melt pump may be provided between the extruder and the needle shut-off nozzle.

In order to regulate the volumetric flow, the relative velocity between the 3D print nozzle and the print table may be employed.

A suitable apparatus for carrying out the method comprises a device for producing and providing a melt, a needle shut-off nozzle, a 3D print nozzle, a print table and a control device. The control device is configured to be capable of controlling drives for moving the 3D print nozzle and/or the print table in a manner such that the 3D print nozzle and/or the print table can be moved in space in accordance with a computer program which is specific for the product. The control device is further configured to actuate a drive for moving the nozzle needle in a manner such that a specified volumetric flow of melt being discharged from the 3D print nozzle can be maintained. The needle shut-off nozzle comprises a housing and a nozzle needle which can be displaced therein, wherein the nozzle needle can be moved between a closed position in which the nozzle needle bears against an outlet opening of the needle shut-off nozzle and closes it, and an open position in which the nozzle needle is at a specifiable distance from the outlet opening.

A suitable computer may be used as the control device. In particular, the computer should be configured to be able to move the 3D print nozzle and/or the print table in space in accordance with a computer program which is specific for the product, in that suitable signals in accordance with the computer program may be sent to the drives in order to move the 3D print nozzle and/or the print table.

In accordance with a preferred embodiment, the nozzle needle has a needle tip which tapers conically at least in sections and for this purpose, the front end of the housing is appropriately conical in configuration in a manner such that in the closed position of the needle shut-off nozzle, the needle tip and the front end of the housing come into close contact against one another and the throughput of melt is interrupted. By moving the nozzle needle, the channel cross section between the conically configured surfaces of the nozzle needle and housing can be varied in accordance with a specified volumetric flow of melt being discharged from the 3D print nozzle.

In accordance with one embodiment, in order to move the nozzle needle, a threaded spindle drive may be provided which can preferably be actuated by means of an electric motor. The drive for moving the nozzle needle may in this regard be configured as a servo motor with an absolute measuring system and directly coupled threaded spindle. In this manner, the nozzle needle can be moved from the closed position into an open position in a continuously variable manner. The dosing of the melt and therefore the maintenance of a specified volumetric flow may be obtained by a continuous displacement of the nozzle needle in the housing and the associated variation of the channel cross section of passage.

In order to produce and provide the melt, different types of devices which are known per se may be provided, in particular such as a single screw extruder, a multiple screw extruder, a melt pump, a thermoset mixing head system, a disk extruder or a heat convection melt system.

In accordance with a further preferred embodiment, a first pressure sensor may be provided between the outlet from the device for the production and provision of the melt and a second pressure sensor may be provided between the outlet from the needle shut-off nozzle and the inlet of the 3D print nozzle. The signals from the first and the second pressure sensors may be sent via suitable data lines to the control device and can be analysed thereby, in particular in order to maintain a specified volumetric flow of melt.

The region of the outlet opening of the needle shut-off nozzle should be configured in a suitable manner for coupling of a 3D print nozzle, for example with the use of a suitably shaped transfer piece having a melt channel and to which the 3D print nozzle per se can be connected.

A particular advantage of the present invention lies in the comparatively low weight of the print head consisting of a device for the provision of a melt, the unit for regulating the volumetric flow of the melt and the 3D print nozzle. The unit for regulating the volumetric flow of the melt of conventional systems is usually constructed with heavy and complicated melt pumps. By omitting the comparatively heavy melt pumps, 3D printer kinematics can be designed with reduced stiffnesses. Inexpensive axles, a lighter steel construction and drives with less power may be used. Overall, this leads to a reduction in the manufacturing costs for a 3D printer configured in accordance with the invention.

Because of the low weight or the low inertia, the 3D print head can also achieve higher accelerations during printing operations. This leads to a saving in print time during the additive manufacture of the product. As a consequence, there are cost advantages in manufacturing a product compared with the manufacture of the same product with 3D printers which operate more slowly.

BRIEF DESCRIPTION OF THE DRAWINGS

The invention will now be described in more detail with the aid of an exemplary embodiment and with reference to FIGS. 1 and 2. In the figures.

DESCRIPTION OF EXAMPLE EMBODIMENTS

Figure 1:
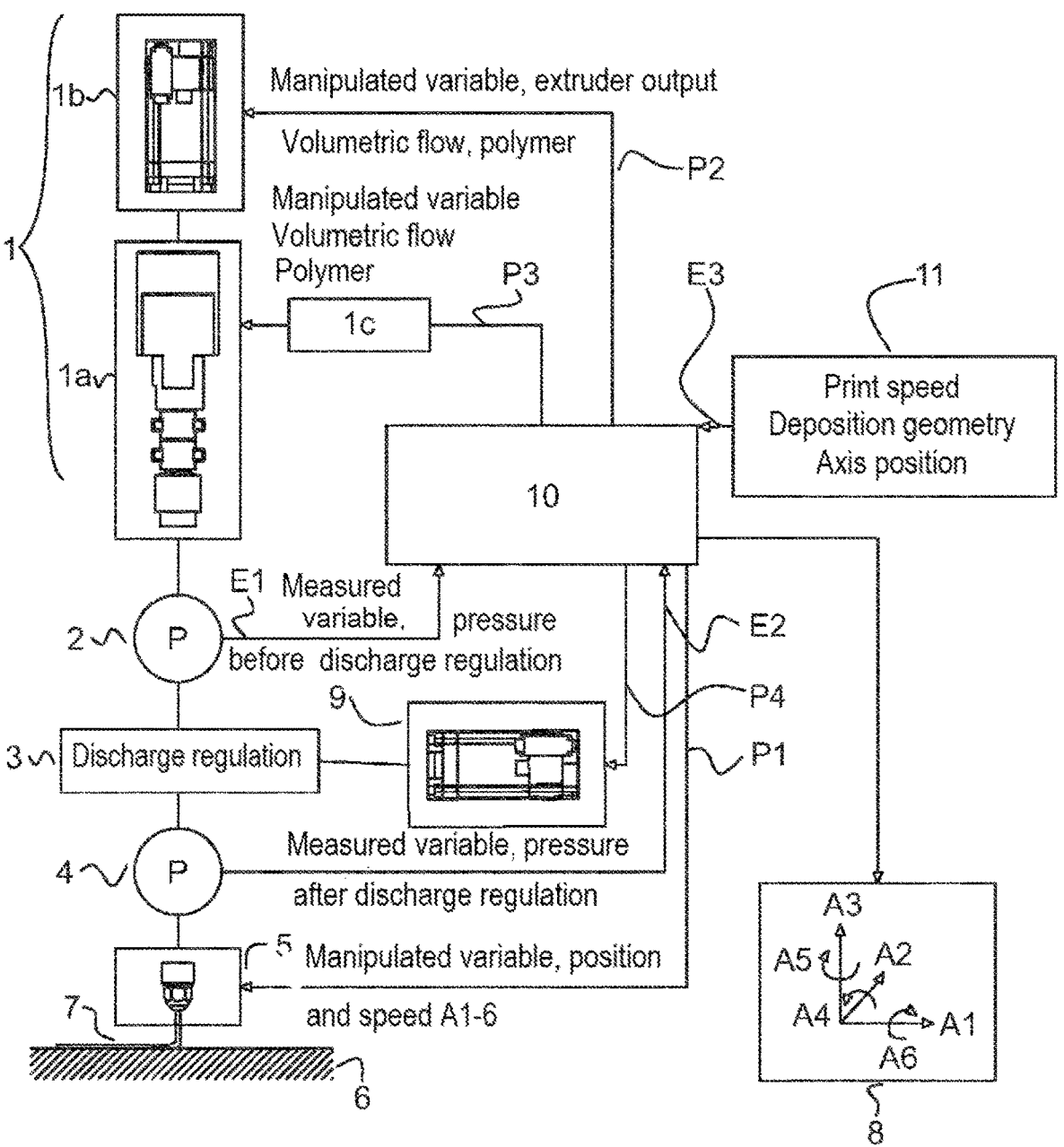
FIG. 1 shows a block diagram of a 3D printer in accordance with the invention.
Figure 2:
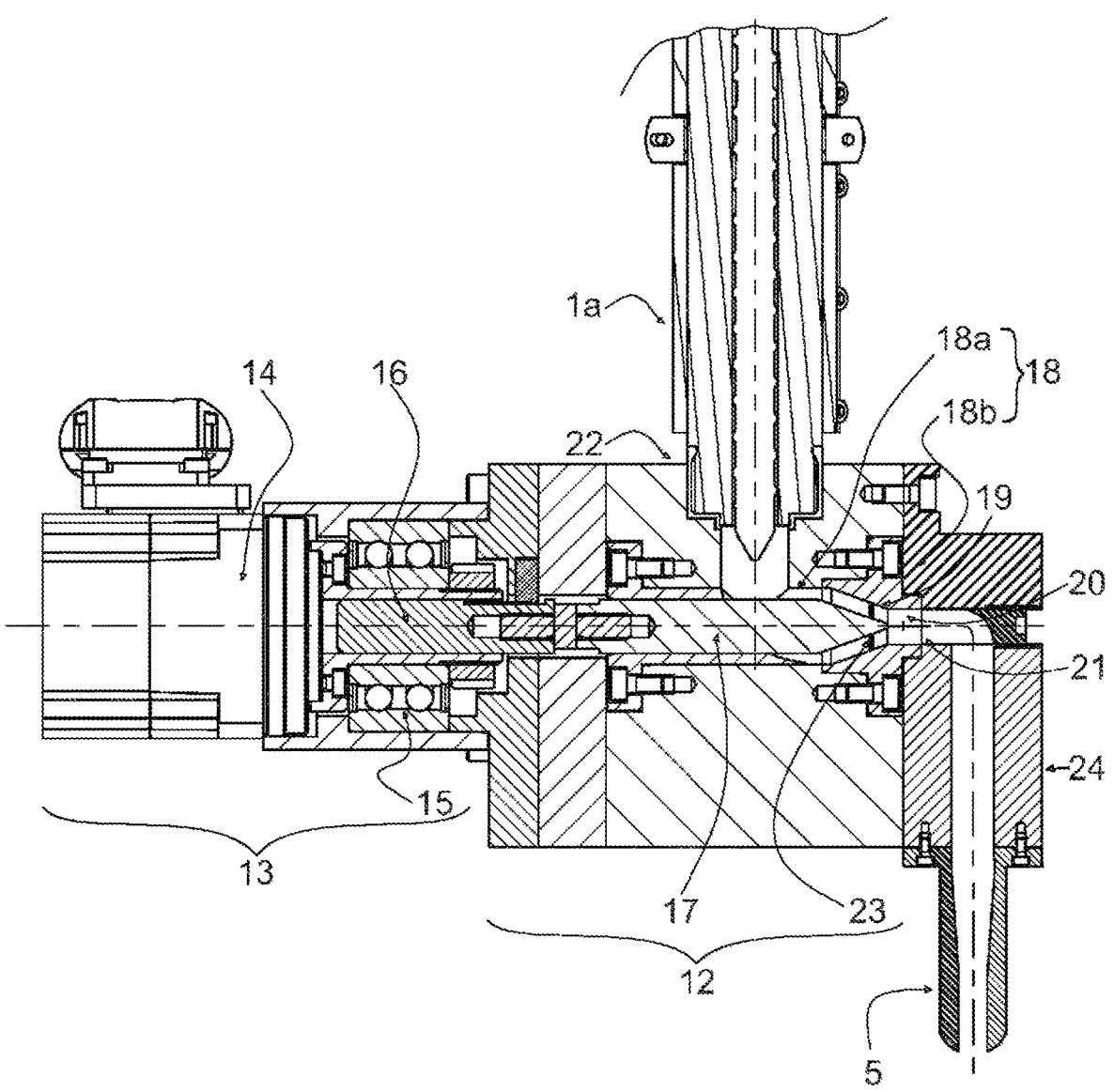
FIG. 2 shows the needle shut-off nozzle in longitudinal section.

In accordance with FIG. 1, a 3D printer in accordance with the invention comprises a device which is known per se for the production and provision of a melt. In the exemplary embodiment of FIG. 1, this is a melt extruder 1 comprising a single screw extruder 1a and a drive motor 1b with which the screw of the single screw extruder 1a is driven in rotation. By way of example, the drive motor employed may be a hydraulic motor, a servo motor or a step motor. Furthermore, a material dosing device 1c is provided on the single screw extruder 1a, with which a polymer material to be melted can be placed in the single screw extruder 1a. Downstream of the single screw extruder 1a are a first pressure sensor 2, a needle shut-off nozzle 3, a second pressure sensor 4, a 3D print nozzle 5 as well as a print table 6. In known manner, a melt filament 7 is discharged from the 3D print nozzle 5 and deposited on the print table 6. The 3D print nozzle 5 and/or the print table 6 can be moved in space along the axes A1 to A6, as illustrated diagrammatically in the field 8. Details concerning the needle shut-off nozzle are shown in FIG. 2 and will be described in more detail below. However, a drive 9 for moving the nozzle needle is shown. Furthermore, a control device 10 is provided to which, inter alia, the signals from the two pressure sensors 2 and 4 are sent and which are analysed by it. The signals from the pressure sensors 2 and 4 are sent to the control device as input signals, as illustrated by the arrows E1 and E2. Other data which are sent to the control device 10 are given in field 11 and comprise, inter alia, the print speed, the deposition geometry as well as the axis positions. In this regard, the print speed is the speed of movement of the 3D print head or also of the 3D print table, which is specified by the calculated component build rate of the superordinate machine controller and the component print time set by the user. The deposition geometry is defined by the geometric configuration and the layered construction of the object to be printed via the machine controller. The axis positions 8 of the 3D printing machine are specified by the machine controller and the object to be printed. The 3D print head 5 or in addition the print table 6 may advantageously be moved in six (6) axes A1, A2, A3, A4, A5 and A6. The transmission of these input signals to the control device 10 is illustrated by the arrow E3.

A suitable computer or in fact a programmable logic controller (PLC) may be used as the control device 10. In particular, the computer is configured so as to be capable of moving the 3D print head and/or the print table in space in accordance with a computer program which is specific to the product by sending suitable signals in accordance with the machine controller to the drives (not shown here) for moving the 3D print head and/or the print table. The control of these drives is illustrated by the arrow P1. Furthermore, the controller sends control signals to the drive motor 1b (see arrow P2), to the material dosing device 1c (see arrow P3) and to the drive 9 for moving the nozzle needle (see arrow P4).

The 3D printer is modular in construction so that, instead of the screw melt extruder shown in FIG. 1, another device for the production and provision of a melt may be employed. In this regard, it may, for example, be a melt pump, a thermoset mixing head system, a disk extruder or a conventional heat convection melt system.

FIG. 2 shows a needle shut-off nozzle 12 and a drive 13 for moving the nozzle needle. The drive 13 comprises the drive motor 14 and a gear 15. A servo motor with a shaft encoder may be used as the drive motor 13. The gear 15 here is configured as a spindle gear and the threaded spindle 16 is directly operatively connected to the servo motor 14. The needle shut-off nozzle 12 comprises several housing components and the nozzle needle 17 itself. The nozzle needle 17 is operatively connected to the threaded spindle 16 for the purposes of drive and can be moved by it in the housing of the needle shut-off nozzle 12 when the servo motor 14 is actuated. The housing comprises a housing component 18 which surrounds the nozzle needle 17 which in the present case is configured in two parts. A first housing component 18a is configured as a hollow cylinder and faces the threaded spindle 16. A second housing component 18b is disposed on the side of the needle shut-off nozzle 12 facing away from the threaded spindle 16. This second housing component 18b is provided with a conically configured section 19 which faces the tip of the nozzle needle 17 and is provided with a section 20 configured with a cylindrical cross section and forming an outlet channel, at the end of which is an outlet opening 21. The housing component 18b is shaped in a manner such that the 3D print nozzle 5 can be attached there, for example by means of a suitably shaped transfer piece 24. The transfer piece 24 therefore forms the connecting piece for the 3D print nozzle 5. A recess 22 is provided in the housing of the needle shut-off nozzle 12 and constitutes the interface with the single screw extruder 1a. The single screw extruder can be directly connected to this recess 22 via its front end, or a melt line may be disposed between the outlet from the single screw extruder 1a and the recess 22. Thus, the melt produced and provided by the single screw extruder 1a can be supplied to the needle shut-off nozzle 12 via the recess 22 and be directed into the 3D print nozzle 5 via the outlet opening 21 and the transfer piece 24.

The nozzle needle 17 has a conically tapered needle tip and in this regard, the front end of the housing 12 or of the housing component 18b is appropriately conically configured in a manner such that in the closed position, the needle tip and the front end of the housing 12 or of the housing component 18b come into close contact against one another and the throughput of melt through the outlet opening 21 is interrupted. By means of the drive 13, the nozzle needle 17 can be moved between the closed position, in which the nozzle needle 17 bears against the outlet opening 21 and closes it, and an open position in which the nozzle needle 17 is at a specifiable distance from the outlet opening 21. By moving the nozzle needle 17, the channel cross section 23 between the conically configured surfaces of the needle tip and the housing component 18b can be varied. In this manner, the volumetric flow of melt can be varied in accordance with a specifiable volumetric flow.

The operation of the 3D printer will now be described.

The control device 10 compiles the speed of movement and the positions for the multiaxial kinematics via parameters such as print speed, deposition geometry and axis position. In this regard, the 3D print nozzle 5 and/or the print table 6 can be moved along the multiaxial system (see field 8 in FIG. 1).

A volumetric flow of melt required for the additive manufacture of the desired product is specified via the geometry of the melt filament 7 and the speed of movement of the 3D print nozzle 5 and/or print table 6. The control parameter for the variation in the cross section of the channel cross section 23 is derived by comparing the pressure between the first pressure sensor 2 after the single screw extruder 1a and the second pressure sensor 4 before the 3D print nozzle 5. In addition, the plastification speed for the single screw extruder 1a is adjusted in order to prevent a blockage of material and a backflow in the system. The volumetric flow is regulated via the variable channel cross section 23 and the associated pressure drop. A control curve which is a function of the geometry of the 3D print nozzle is stored in the control device 10 which compares the channel cross section 23, the rotational speed of the single screw extruder 1a, the pressure at the second pressure sensor 4 and the empirically determined discharge capacity (volumetric flow of the melt).

The discharge of melt can be stopped by completely closing the channel cross section 23. This stops the melt from dripping out of the 3D print nozzle 5. By abruptly retracting the nozzle needle 17, a negative pressure can be produced in the system which effectively prevents melt from dripping out of the 3D print nozzle 5, in particular during rapid dry runs, i.e. runs in which the 3D print head and/or the print table are moved without depositing a melt filament 7. By means of this method, the occurrence of stringing during dry runs in 3D printing is also avoided.

LIST OF REFERENCE NUMERALS screw melt extruder
1a single screw extruder
1b extruder drive motor
1c material dosing device
2 first pressure sensor
3 block diagram for needle shut-off nozzle
4 second pressure sensor

7

5 3D print nozzle
6 print table
7 melt filament
8 multiaxial system
9 drive for nozzle needle
10 control device (PLC) or computer
11 block diagram for input parameters
12 needle shut-off nozzle
13 nozzle needle drive
14 servo motor
15 spindle gear
16 threaded spindle
17 nozzle needle
18 housing
18a spindle-side housing component
18b 3D print nozzle-side housing component
19 conical section of housing component 18b
20 cylindrical section of housing component 18b
21 outlet opening
22 recess or interface for single screw extruder 1a
23 channel cross section
24 transfer piece
E1-E3 input variables
P1-P4 control signals or output variables

The invention claimed is:

1. A method for the additive manufacture of a product, wherein a melt is discharged via a 3D print nozzle and the melt is deposited in the form of a melt filament in order to build the product on a print table, wherein the 3D print nozzle and/or the print table are moved in space in accordance with a computer program which is specific for the product, wherein the melt is produced by an extruder which is in fluid connection with a needle shut-off nozzle, wherein a first pressure is measured by a first pressure sensor located between the extruder and the needle shut-off nozzle and sent to a controller, wherein the melt is directed to the 3D print nozzle via the needle shut-off nozzle having a housing and a nozzle needle which can be displaced therein, wherein a second pressure is measured by a second pressure sensor located between an outlet opening of the housing and an inlet of the 3D print nozzle and sent to the controller, wherein, while carrying out a printing procedure, the nozzle needle is moved between a closed position, in which the nozzle needle bears against the outlet opening of the housing which is in fluid communication with the 3D print nozzle and which closes said outlet opening, and an open position, in which the nozzle needle is at a distance from the outlet opening of the housing which can be specified,

wherein, for the additive manufacture of the product, a volumetric flow of melt being discharged from the 3D print nozzle is specified by a shape of an outlet opening of the 3D print nozzle and therefore of a geometry of the melt filament to be deposited on the one hand and the speed of movement of the 3D print nozzle and/or of the print table on the other hand, wherein the nozzle needle is moved between the closed position and the open position while carrying out the printing procedure in a manner such that during the additive manufacture of the product, the specified volumetric flow of melt being discharged from the 3D print nozzle is maintained, wherein a control curve which is a function of the geometry of the 3D print nozzle, of the shape of the outlet opening of the 3D print nozzle and therefore of the geometry of the melt filament to be deposited, is stored in the controller and this control curve is used during the additive manufacture of the product, wherein a channel cross section between conically configured surfaces of the nozzle needle and housing is varied in accordance with the control curve, and wherein the volumetric flow of melt is regulated via the varied channel cross section and a comparison between the first pressure and the second pressure.

2. The method as claimed in claim 1,
wherein the nozzle needle has a needle tip which tapers conically at least in sections, in that for this purpose, the front end of the housing is appropriately conical in configuration in a manner such that the needle tip and the front end of the housing are in close contact against one another in the closed position of the needle shut-off nozzle and the throughput of melt is interrupted, and in that by moving the nozzle needle, the channel cross section is varied in accordance with the specified volumetric flow.

3. The method as claimed in claim 1,
wherein prior to carrying out dry runs in which the 3D print nozzle and/or the print table are moved without depositing a melt filament, the nozzle needle is initially retracted and subsequently moved into the closed position.

4. The method as claimed in claim 1,
wherein the fluid connection employed is a pipe or a tube.

5. The method as claimed in claim 2,
wherein a melt pump is provided between the extruder and the needle shut-off nozzle.

6. The method as claimed in claim 1,
wherein the relative velocity between the 3D print nozzle and the print table is employed in order to regulate the volumetric flow.

* * * * *